US010527055B2

(12) United States Patent
Lunsford et al.

(10) Patent No.: US 10,527,055 B2
(45) Date of Patent: Jan. 7, 2020

(54) MULTI-PIECE IMPELLER

(71) Applicant: Rolls-Royce Corporation, Indianapolis, IN (US)

(72) Inventors: Patrick L. Lunsford, Danville, IN (US); Samuel J. LaCombe, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 284 days.

(21) Appl. No.: 15/473,937

(22) Filed: Mar. 30, 2017

(65) Prior Publication Data

US 2017/0204872 A1 Jul. 20, 2017

Related U.S. Application Data

(63) Continuation of application No. 14/143,245, filed on Dec. 30, 2013, now Pat. No. 9,759,225.

(Continued)

(51) Int. Cl.
*F04D 29/28* (2006.01)
*F01D 5/04* (2006.01)
*F01D 5/06* (2006.01)
*F04D 17/10* (2006.01)
*F04D 29/08* (2006.01)
(Continued)

(52) U.S. Cl.
CPC .............. *F04D 29/284* (2013.01); *F01D 5/04* (2013.01); *F01D 5/066* (2013.01); *F04D 17/10* (2013.01); *F04D 29/056* (2013.01); *F04D 29/083* (2013.01); *F04D 29/624* (2013.01); *Y02T 50/673* (2013.01); *Y10T 29/49329* (2015.01)

(58) Field of Classification Search
CPC ... F01D 5/066; F01D 5/04; F01D 5/34; F04D 29/284; F04D 29/083; F04D 29/624; F04D 29/20; F04D 29/263; F04D 29/266; F04D 17/10
See application file for complete search history.

(56) References Cited

U.S. PATENT DOCUMENTS 2,482,462 A 9/1949 Browne et al.
3,572,967 A 3/1971 O'Hara et al.
(Continued)

FOREIGN PATENT DOCUMENTS

EP 408010 A1 1/1991
EP 518027 A1 12/1992
(Continued)

OTHER PUBLICATIONS

International Search Report for PCT International Application Serial No. PCT/US2013/078204, dated Dec. 30, 2013, (10 pages).

*Primary Examiner* — Igor Kershteyn
*Assistant Examiner* — Juan G Flores
(74) *Attorney, Agent, or Firm* — Barnes & Thornburg LLP

(57) ABSTRACT

An impeller includes a shell having a plurality of blades. The shell may also define a cavity. The impeller may further include a backplate that engages at least a portion of the shell. The backplate can include a post which can be coupled to the impeller through a fastener such as a threaded nut. The backplate can be thereafter clamped to the impeller shell. Seals can be provided in the impeller, such as in the backplate. The backplate and impeller shell can be piloted onto each other. In some forms splines can be used to secure the backplate to the impeller shell.

20 Claims, 4 Drawing Sheets

Related U.S. Application Data

(60) Provisional application No. 61/774,943, filed on Mar. 8, 2013.

(51) Int. Cl.
*F04D 29/62* (2006.01)
*F04D 29/056* (2006.01)

(56) References Cited

U.S. PATENT DOCUMENTS

| | | |
|---|---|---|
| 4,152,092 A | 5/1979 | Swearingen et al. |
| 4,183,719 A | 1/1980 | Bozung et al. |
| 4,273,512 A | 6/1981 | Weiler et al. |
| 4,428,717 A * | 1/1984 | Catterfeld ............... F04D 7/04 |
| | | 29/889.4 |
| 4,787,821 A | 11/1988 | Cruse et al. |
| 4,806,078 A * | 2/1989 | Heumann ............... F04D 29/20 |
| | | 403/30 |
| 5,269,665 A | 12/1993 | Sadler et al. |
| 5,372,499 A | 12/1994 | Motomura et al. |
| 5,520,008 A * | 5/1996 | Ophir ................... F04D 29/023 |
| | | 416/185 |
| 5,895,203 A | 4/1999 | Klein et al. |
| 6,935,840 B2 | 8/2005 | Romani et al. |
| 6,935,842 B2 | 8/2005 | Tai |
| 2005/0056013 A1 | 3/2005 | Furman et al. |
| 2007/0059179 A1 | 3/2007 | Xu |
| 2007/0065276 A1 | 3/2007 | Muller et al. |

FOREIGN PATENT DOCUMENTS

| | | | |
|---|---|---|---|
| FR | 1122205 A * | 9/1956 | ............ F01D 5/046 |
| FR | 1122205 A | 9/1956 | |
| WO | 0140660 A2 | 6/2001 | |

* cited by examiner

MULTI-PIECE IMPELLER

CROSS REFERENCE TO RELATED APPLICATIONS

This application is a continuation of U.S. Non-provisional patent application Ser. No. 14/143,245, filed on Dec. 30, 2013, which claims priority to and the benefit of U.S. Provisional Patent Application No. 61/774,943, filed on Mar. 8, 2013, the disclosures of each of which are now expressly incorporated herein by reference, including but not limited to each of their disclosures related to impellers.

TECHNICAL FIELD

The present application relates to gas turbine engine impellers, and more particularly, but not exclusively, relates to gas turbine engine multi-piece impellers.

BACKGROUND

Providing for the construction of gas turbine engine impellers remains an area of interest. Some existing systems have various shortcomings relative to certain applications. Accordingly, there remains a need for further contributions in this area of technology.

SUMMARY

One embodiment of the present application is directed to a unique impeller. Other embodiments include unique methods, systems, devices, and apparatus related to multi-piece impellers. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF REPRESENTATIVE EMBODIMENTS

Figure 1:
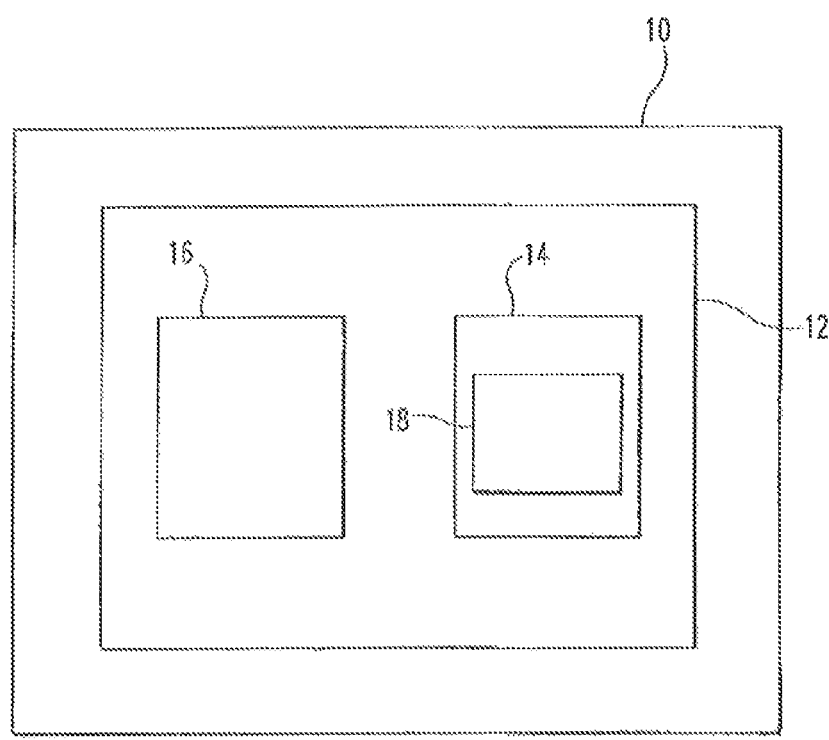
FIG. 1 is a block diagram of an aircraft.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates are contemplated herein.

FIG. 1 is a schematic block diagram of an aircraft 10. The aircraft 10 may include, but is not limited to, helicopters, airplanes, unmanned aerospace vehicles, fixed wing vehicles, variable wing vehicles, rotary wing vehicles, tilt-wing vehicles, tilt-rotor vehicles, hover crafts, and others. Furthermore, the present application is contemplated for utilization in other applications that may not be coupled with an aircraft such as, for example, industrial applications, power generation, pumping sets, naval propulsion, and other applications known to one of ordinary skill in the art.

The aircraft 10 includes a power generation system 12 that provides power to the aircraft 10 such as, but not limited to, propulsive power. The power generation system 12 includes a gas turbine engine 14 and in the illustrated form also includes an auxiliary power unit 16, though it will be appreciated that not all embodiments of the power generation system 12 includes an auxiliary power unit 16. The auxiliary power unit 16 can take on a variety of forms and can be coupled with a generator that generates electrical power used to power various electrical systems on the aircraft 10.

Figure 2:
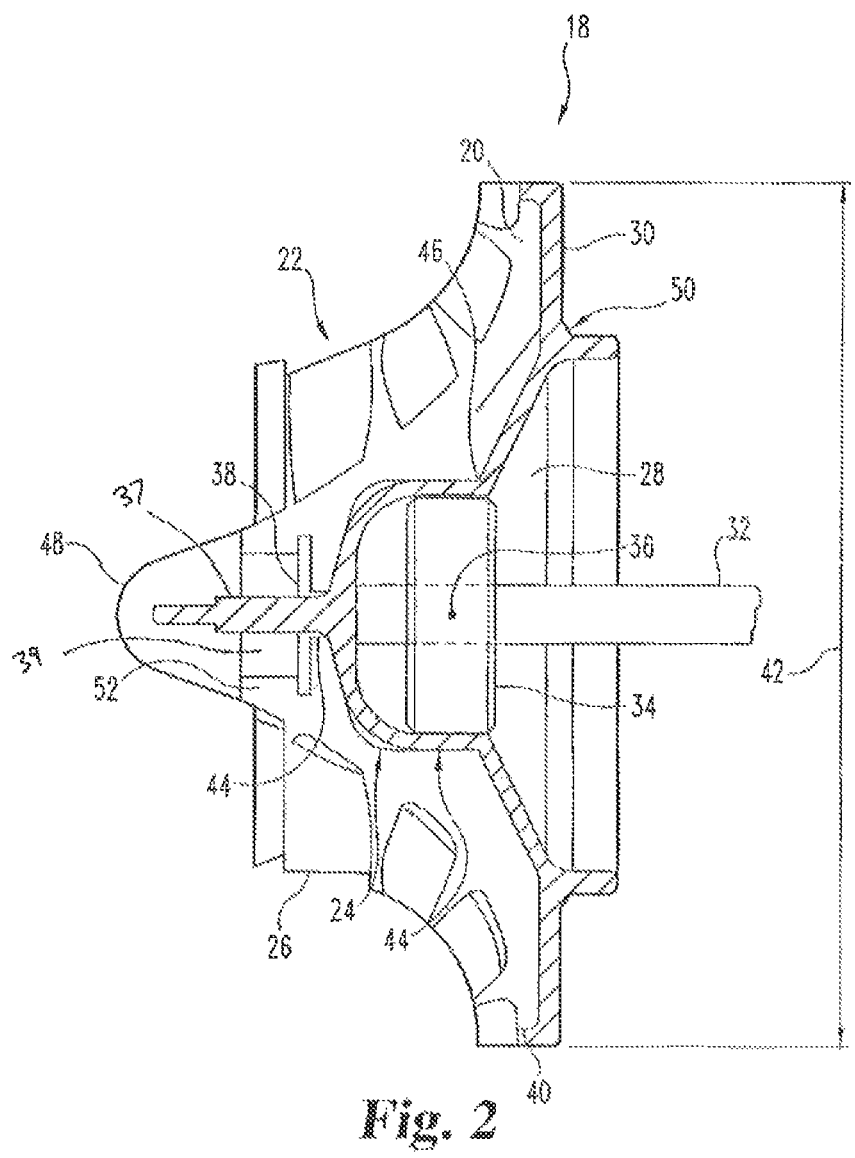
FIG. 2 is a cross-sectional view of one embodiment of an impeller.

Turning now to FIG. 2, either or both the gas turbine engine 14 and auxiliary power unit 16 can include an impeller 18. FIG. 2 depicts a cross-sectional view of one embodiment of the impeller 18. The impeller 18 may be a centrifugal flow compressor, however it is contemplated that the principles of the present application may be applied to other gas turbine engine impellers whether or not centrifugal flow compressors.

The impeller 18 includes a shell 20 having a first side 22 and a second side 24. The first side 22 includes one or more blades 26 extending therefrom and which are used to change a pressure of working fluid flowing through a turbomachinery component that includes the impeller 18. For ease of description and as will be appreciated, as will be used herein the blades 26 refer generally to aerodynamic shaped members that extend into the flow path and can any suitable member such as blades and inducers, etc. The shell 20 may be formed using any suitable process such as, but not limited to, casting, milling, machining, forging, or any combination thereof. Furthermore, the shell 20 can be made from a variety of materials, including titanium and assorted alloys thereof as one non-limiting example. One non-limiting embodiment of the second side 24 is shown in FIG. 2 as including a cavity 28.

The impeller 18 of the present application includes a backplate 30 that is used to cover, partially cover, or be inserted into the cavity 28 and which engages at least a portion of the second side 24 of the shell 20. The backplate 30 may be formed using any suitable process such as, but not limited to, casting, milling, machining, forging, or any combination thereof. Furthermore, the backplate 30 can be made from a variety of materials, including steel as one non-limiting example. Generally, the backplate 30 is one of the most highly stressed areas on an impeller. As will be appreciated given the description above, the shell 20 and the backplate 30 can be formed from different materials.

The gas turbine engine 14 may also include a shaft 32 that is attached to the backplate 30. In the illustrated embodiment, a bearing 34 is provided on the shaft 32 to support the shaft 32 as the impeller 18 rotates. The bearing 34 may be any suitable type of bearing including journal bearings, rolling element bearings, etc.

In the embodiment shown in FIG. 2, the backplate 30 extends substantially around a surface area of the cavity 28, which allows the bearing 34 to be located at least partially inside the cavity 28, In some embodiments the bearing 34 can be at approximately a center of gravity 36 of the impeller 18 such that the impeller 18 is non-cantilevered. A non-cantilevered impeller 18 can provide for the elimination of moment loads on the bearing 34. In addition, the bearing 34 can provide a more stable and rigid support for the impeller 18.

The backplate 30 can be secured to the shell 20 in one or more ways. As shown in the illustrated embodiment, the backplate 30 includes a post 37 that extends away from the shaft 32 and through a portion of the first side 22. The backplate 30 and impeller 18 can be clamped forward using a nut 39 and washer 38. The post 37 can include threaded features which receive the nut 39. The post 37 can extend through a passage formed in the impeller 18. The nut 39 and post 37 can be reverse threaded. In some embodiments one or more posts can be used to extend through one or more passages. The passage can take the form of a cylindrical hole formed through the impeller 18 from the first side 22 to the second side 24, but other shapes are also contemplated. The washer 38, if present, can bear against a load bearing structure formed in the impeller 18, for example a shelf that defines part/all of the passage through which the post 37 extends. In other embodiments that may not include a washer 38, the nut 39 can bear directly against the load bearing structure. Other techniques of securing the post 37/backplate 30 to the impeller 18 other than through a threaded interconnection are also contemplated herein.

The backplate 30 and/or impeller 18 can include pilot features 40 so that the backplate 30 can pilot onto the shell 20, In such cases the pilot features can also provide for a friction drive interconnection between the backplate 30 and impeller 18, Such a piloted feature can be located near or at an exducer diameter 42 as shown in the non-limiting illustrated embodiment. The pilot features can also serve to discourage forward deflection of the shell 20 near the exducer diameter 42 during operation of the impeller 18.

To ensure that the shell 20 and the backplate 30 properly rotate together, splines 44 can be provided in some additional and/or alternative embodiments on the shell 20 and the backplate 30 in one or more locations. The splines 44 may be used, for example, if a friction drive at the pilot or exducer diameter 42 is not sufficient to transmit drive torque. As one example of where the splines 44 may be located, the splines 44 on the shell 20 may be located near the area where the backplate 30 is secured or clamped forward, such as by a nut and washer 38. For example, the splines may be located in the passage of the bore through which the post 37 passes. A spline surface can be formed around the entirety of the passage and cooperate around the entirety of the post 37, but in some embodiments a spline surface need only extend around part of the entirety of the passage and post 37. Other shapes whether continuous, intermittent, symmetric, notched, etc., are also contemplated herein.

In some embodiments the impeller 18 may also include a ring 46 around the cavity 28. For example, the ring 46 may be a stiffening ring that prevents the cavity 28 from ballooning or deforming. In one embodiment, the ring 46 is formed integrally with the shell 20.

The impeller 18 may also include a nose 48 such as a spinner nose. In one embodiment, the nose 48 attaches to the impeller 18 by a reverse thread. For example, the post 37 of the backplate 30 may include threads and the nose 48 includes corresponding mating threads. In other embodiments the nose 48 can attach directly to the first side 22.

The impeller 18 may include one or more seals 50 on an outer portion of the backplate 30. For example, the backplate 30 may include a knife seal or a labyrinth seal to prevent air from flowing to and/or around other components in the gas turbine engine 14.

The impeller 18 may also include a balance stock portion 52 in the shell 20 in which material may be added or removed, e.g., by grinding or machining, so that the impeller 18 is balanced as the impeller 18 rotates.

Figure 3:
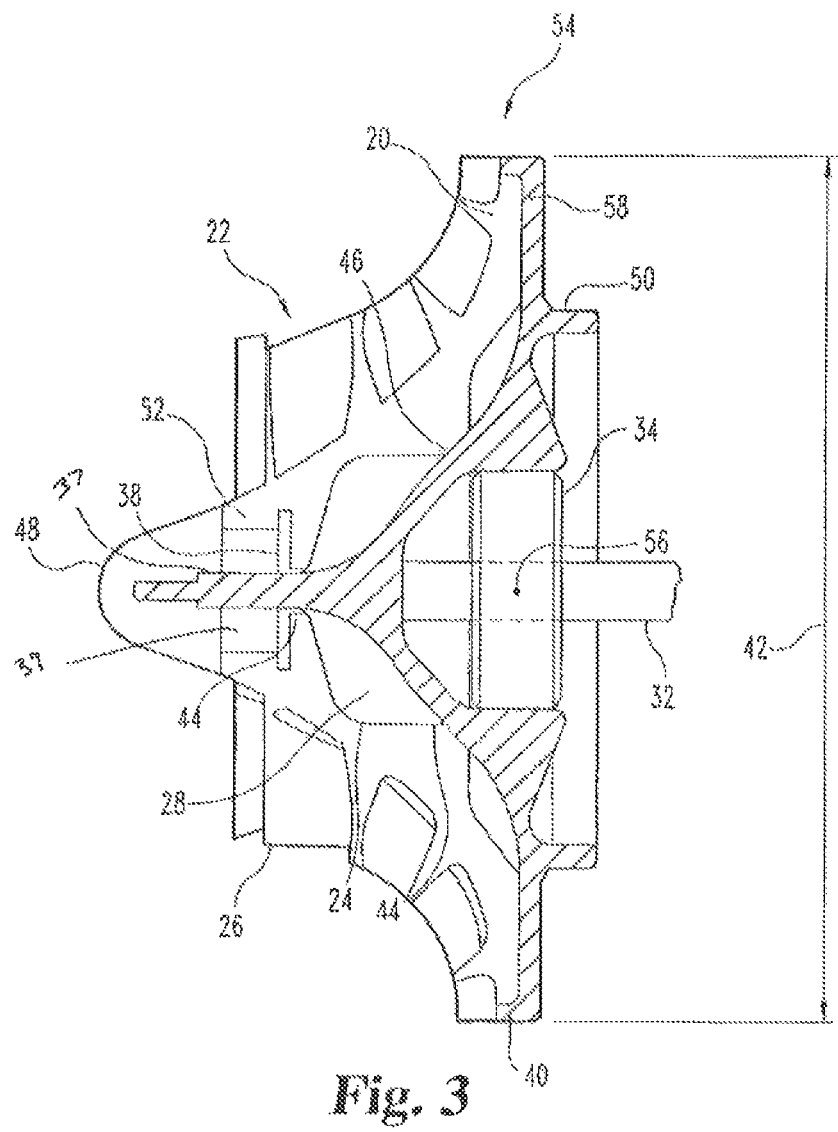
FIG. 3 is a cross-sectional view of another embodiment of an impeller.

FIG. 3 shows another embodiment of an impeller 54 in which the bearing 34 may be located further aft of the nose 48 because the center of gravity 56 of the impeller 54 is shifted in accordance with the weight distribution of the design of the backplate 58. The design of the backplate 58, shell 20, etc. depicted in FIG. 3 can include any of the variations discussed above with respect to any of its illustrated components, interconnections, etc. In FIG. 3, the backplate 58 does not extend substantially around a surface area of the cavity 28 thus forming a large area between the shell 20 and backplate 30. Thus, the center of gravity 56 of the impeller 54 is shifted according to this illustrated embodiment. It will, however, be appreciated that the bearing 34 can be located near the center of gravity thus minimizing the cantilever effect.

Figure 4:
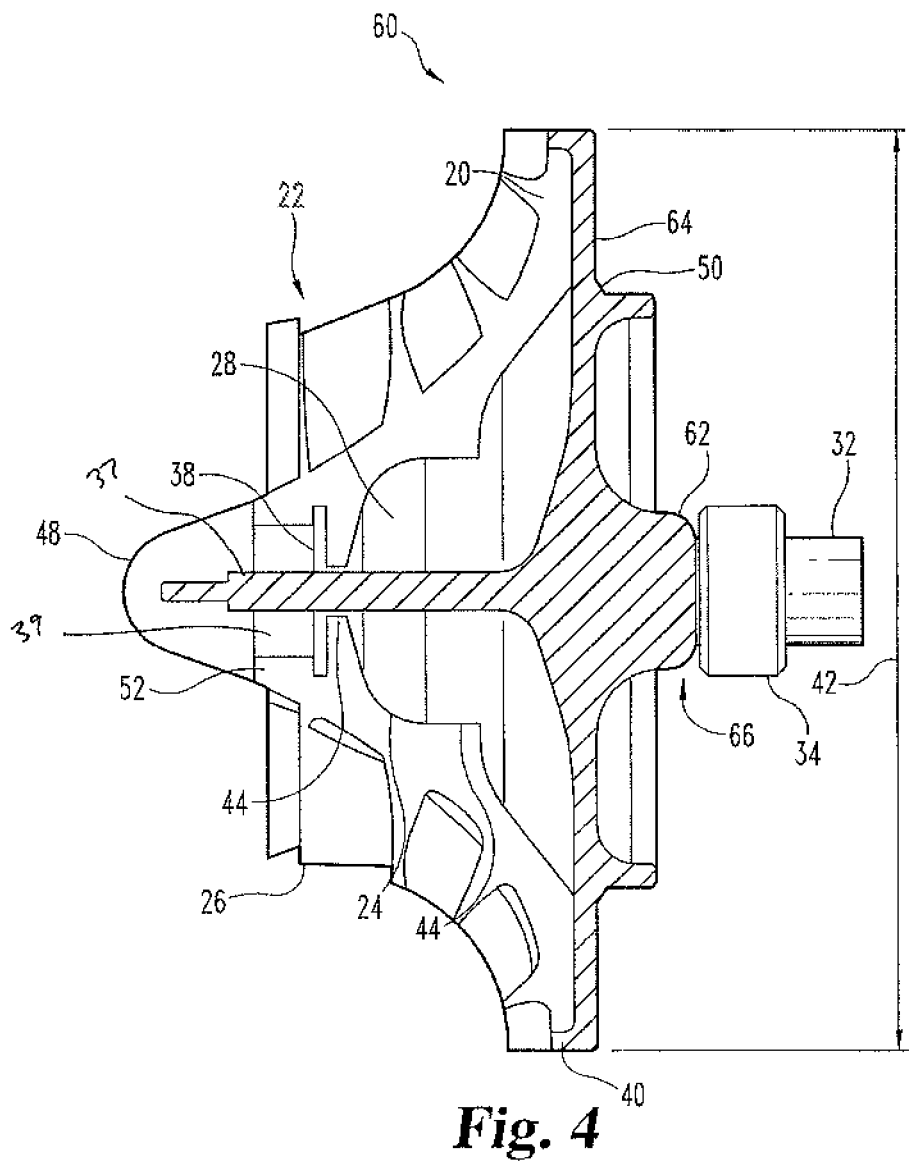
FIG. 4 is a cross-sectional view of yet another embodiment of an impeller.

FIG. 4 shows yet another non-limiting embodiment of an impeller 60 in which the bearing 34 is located outside of the cavity 28. The bearing 34 couples to the shaft 32 near an extension 62 of the backplate 64. The design of the backplate 64, shell 20, etc. depicted in FIG. 4 can include any of the variations discussed above with respect to any of its illustrated components, interconnections, etc. The backplate 64 and/or shaft 32 include the appropriate geometry 66 to connect with one or more other shafts (not shown) in the gas turbine engine 14.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A turbomachinery impeller assembly of a gas turbine engine, the assembly comprising:
    an impeller shell having a first side and a second side, the impeller shell including a number of blades extending from the first side and having aerodynamic shape for changing a pressure of a working fluid flowing through the gas turbine engine, the impeller shell defining a cavity on the second side;
    a backplate arranged to engage at least a portion of the second side of the impeller shell and secured with the impeller shell for rotation therewith to change the pressure of the working fluid; and
    a shaft assembly including a shaft secured with the backplate and a bearing for supporting the shaft, wherein the bearing is arranged at least partially within the cavity, wherein the backplate includes a protrusion extending through a passage formed in the impeller shell, the protrusion extending at least partially through the cavity, and wherein the shaft is axially spaced apart from the passage formed in the impeller shell.

2. The turbomachinery impeller assembly of claim 1, wherein the shaft is attached to the backplate to rotate together with the impeller shell and the backplate.

3. The turbomachinery impeller assembly of claim 1, wherein the impeller shell includes a stiffening ring formed on the second side inhibiting deformation of the impeller shell, the stiffening ring at least partially defining the cavity.

4. The turbomachinery impeller assembly of claim 2, wherein the bearing is positioned to have at least a portion arranged radially within the stiffening ring.

5. The turbomachinery impeller assembly of claim 4, further comprising a number of pilot features connected to the backplate radially near an exducer diameter, and the bearing is positioned to have the at least a portion arranged axially between the number of pilot features and stiffening ring.

6. The turbomachinery impeller assembly of claim 1, wherein the backplate extends radially near an exducer diameter.

7. The turbomachinery impeller assembly of claim 5, further comprising a number of pilot features connected to the backplate radially near the exducer diameter.

8. The turbomachinery impeller assembly of claim 5, wherein the bearing is positioned to have at least a portion arranged axially beyond the number of pilot features.

9. A turbomachinery impeller assembly of a gas turbine engine, the assembly comprising:
an impeller shell having a forward side and an aft side, the impeller shell including a number of blades extending from the forward side and having aerodynamic shape for changing a pressure of a working fluid of the gas turbine engine, the impeller shell defining a cavity on the aft side;
a backplate arranged to engage at least a portion of the aft side of the impeller shell and secured with the impeller shell for rotation therewith to change the pressure of the working fluid; and
a shaft assembly including a shaft secured with the backplate for rotation together and a bearing for supporting the shaft, wherein the bearing is arranged at least partially within the cavity,
wherein the backplate includes a protrusion extending through a passage formed in the impeller shell, the protrusion extending at least partially through the cavity, and wherein the shaft is axially spaced apart from the passage formed in the impeller shell.

10. The turbomachinery impeller assembly of claim 9, wherein the shaft is attached to the backplate to rotate together with the impeller shell and the backplate.

11. The turbomachinery impeller assembly of claim 9, wherein the impeller shell includes a stiffening ring formed on the aft side inhibiting deformation of the impeller shell, the stiffening ring at least partially defining the cavity.

12. The turbomachinery impeller assembly of claim 11, wherein the bearing is positioned to have at least a portion arranged radially within the stiffening ring.

13. The turbomachinery impeller assembly of claim 12, further comprising a number of pilot features connected to the backplate radially near an exducer diameter, and the bearing is positioned to have the at least a portion arranged axially between the number of pilot features and stiffening ring.

14. The turbomachinery impeller assembly of claim 9, wherein the backplate extends radially near an exducer diameter.

15. The turbomachinery impeller assembly of claim 14, further comprising a number of pilot features connected to the backplate radially near the exducer diameter.

16. The turbomachinery impeller assembly of claim 15, wherein the bearing is positioned to have at least a portion arranged axially beyond the number of pilot features.

17. A turbomachinery impeller assembly of a gas turbine engine, the assembly comprising:
an impeller shell that includes a shell body and a number of blades, the shell body having a first side and a second side spaced apart axially from the first side relative to an axis, the number of blades extend from the first side of the shell body and have aerodynamic shape for changing a pressure of a working fluid flowing through the gas turbine engine, and the shell body defines a cavity that extends axially into the second side of the shell body toward the first side and a passage that extends axially into the second side of the shell body and opens into the cavity;
a backplate secured with the impeller shell for rotation therewith to change the pressure of the working fluid, the backplate includes a backplate body and a protrusion, at least a portion of the backplate body is spaced apart from the second side of the shell body of the impeller shell to form an annular gap between the backplate body and the shell body, the protrusion extends from the backplate body into the cavity and into the passage formed in the impeller shell, and
a shaft assembly that includes a shaft secured with the backplate for rotation with the backplate, the shaft being axially spaced apart from the passage formed in the impeller shell.

18. The turbomachinery impeller assembly of claim 17, wherein the impeller shell includes a stiffening ring that extends axially away from the second side of the shell body into the annular gap between the shell body and the backplate body.

19. The turbomachinery impeller assembly of claim 18, wherein the stiffening ring extends to and directly engages the backplate body to separate the annular gap into two annular chambers.

20. The turbomachinery impeller assembly of claim 19, wherein the backplate body is formed to define a bearing-receiver space that extends axially into the backplate body, the shaft assembly further includes a bearing for supporting the shaft, and the bearing is located in the bearing-receiver space formed in the backplate body.

* * * * *